United States Patent [19]

Wilson

[11] 4,394,398
[45] Jul. 19, 1983

[54] METHOD FOR REMOVING ROT FROM POTATOES

[75] Inventor: Donald C. Wilson, San Jose, Calif.

[73] Assignee: FMC Corporation, Chicago, Ill.

[21] Appl. No.: 331,092

[22] Filed: Dec. 14, 1981

Related U.S. Application Data

[63] Continuation of Ser. No. 149,791, May 14, 1980, abandoned.

[51] Int. Cl.³ .............................................. A23L 1/216
[52] U.S. Cl. ...................................... 426/481; 99/567; 426/482; 426/483
[58] Field of Search .................. 134/6, 25.3, 33; 15/3.14, 3.15; 426/481, 482, 483; 99/516, 536, 567; 149/791

[56] References Cited

U.S. PATENT DOCUMENTS

| | | |
|---|---|---|
| 1,427,270 | 8/1922 | Dunkley . |
| 1,948,884 | 2/1934 | Patterson .................................. 99/11 |
| 2,012,655 | 8/1935 | Bowman .............................. 146/202 |
| 2,445,881 | 7/1948 | Hemmeter ............................ 146/48 |
| 2,477,006 | 7/1949 | Pierson . |
| 2,597,065 | 5/1952 | Chase . |
| 2,631,628 | 3/1953 | Martin .................................. 146/47 |
| 2,766,794 | 10/1956 | Odale . |
| 2,776,690 | 1/1957 | Warren ................................. 146/43 |
| 2,992,666 | 7/1961 | Cagnoni ............................... 146/43 |
| 3,158,187 | 11/1964 | Smith et al. . |
| 3,322,173 | 5/1967 | Snow .................................... 146/47 |
| 3,331,375 | 7/1967 | Hickey et al. ...................... 134/127 |
| 3,370,627 | 2/1968 | Willard ................................ 426/482 |
| 3,794,161 | 2/1974 | Peterson ............................. 209/106 |
| 3,870,809 | 3/1975 | Green et al. ..................... 426/482 X |

Primary Examiner—Marc L. Caroff
Attorney, Agent, or Firm—A. J. Moore; R. B. Megley

[57] ABSTRACT

Decayed portions of potatoes are removed by supporting and advancing the potatoes on a series of rollers relative to a plurality of water spray nozzles with rubber fingers being mounted on some of the rollers. The rubber fingers contact the potatoes with sufficient force to penetrate the decayed portions without damaging the peel or other sound portions of the potatoes while water sprays contact the potatoes with sufficient force to remove the penetrated decayed portions while leaving the remaining portions intact.

12 Claims, 18 Drawing Figures

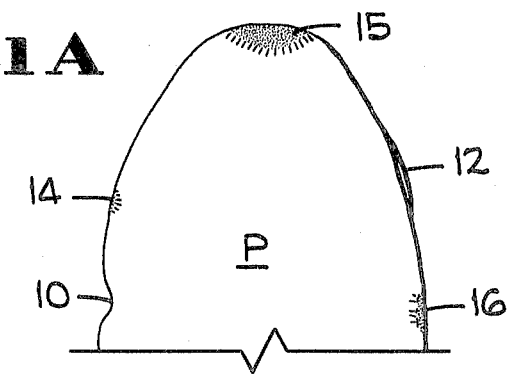
FIG_1A
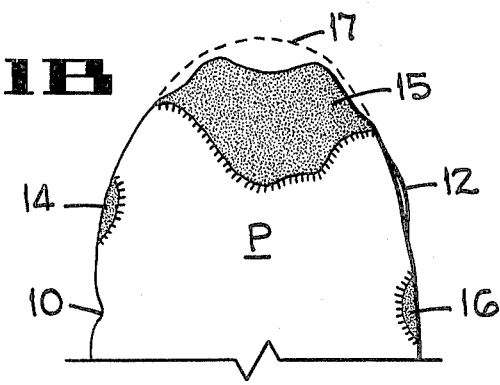
FIG_1B
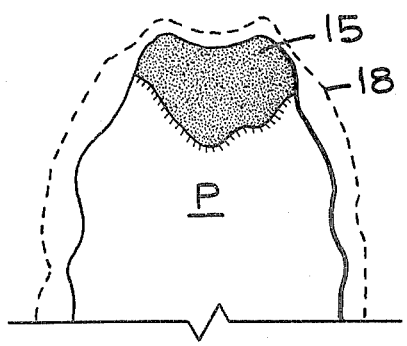
FIG_1C
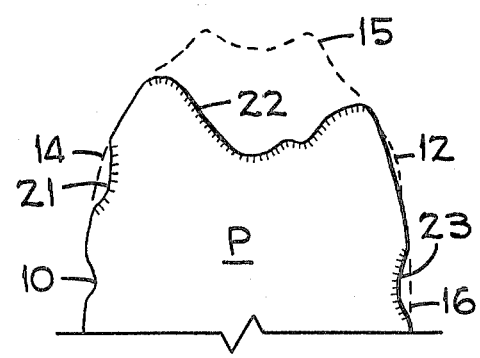
FIG_1D
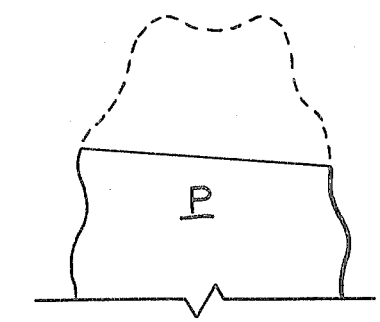
FIG_1E
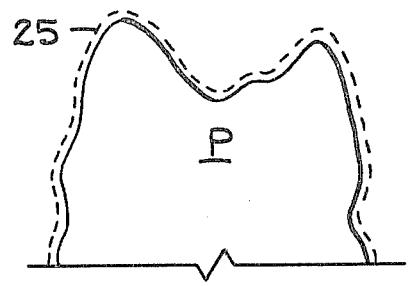
FIG_1F

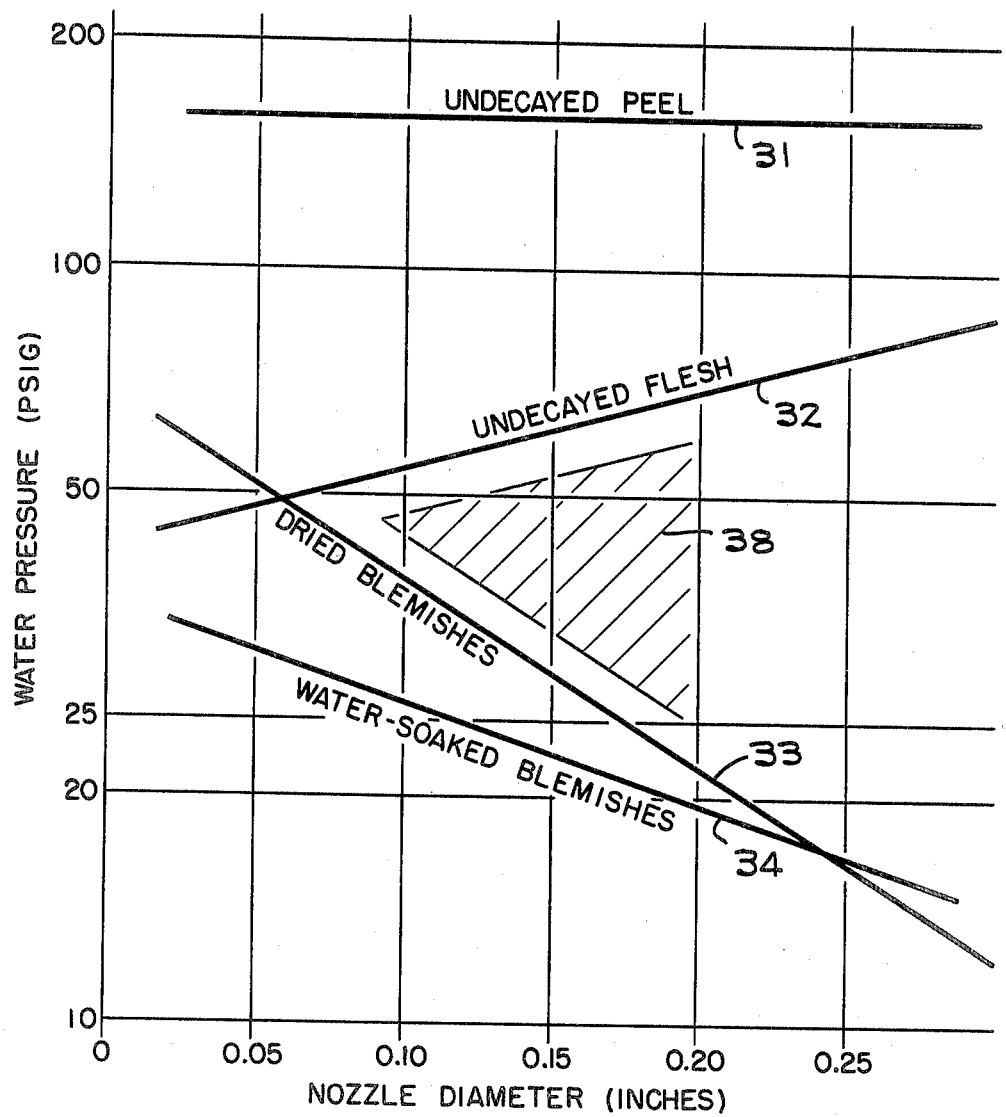

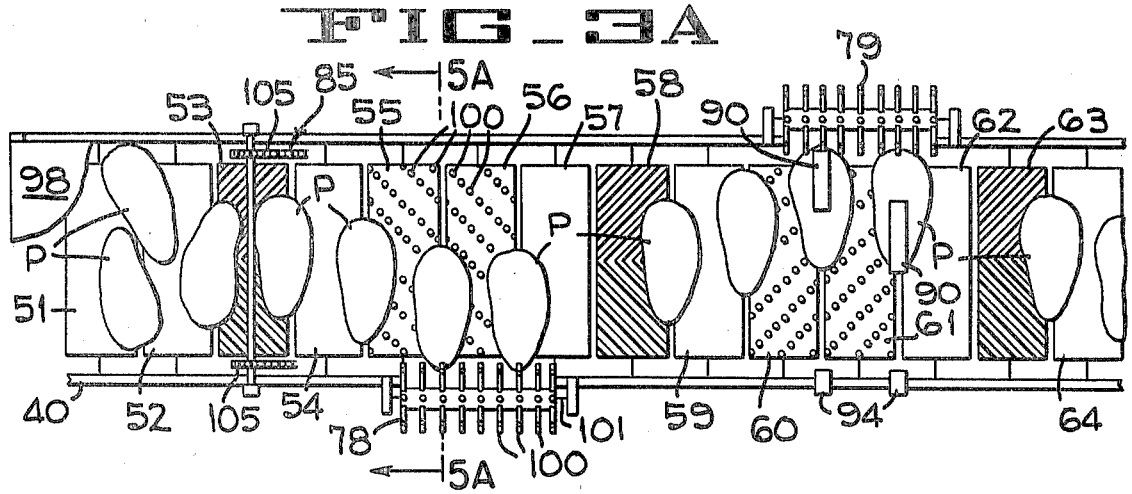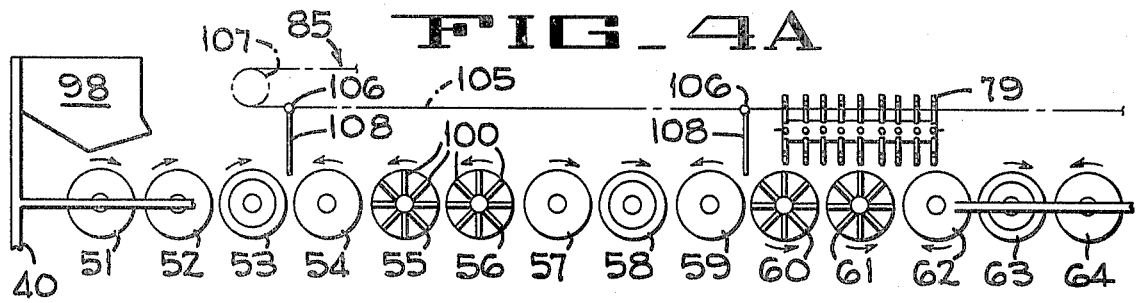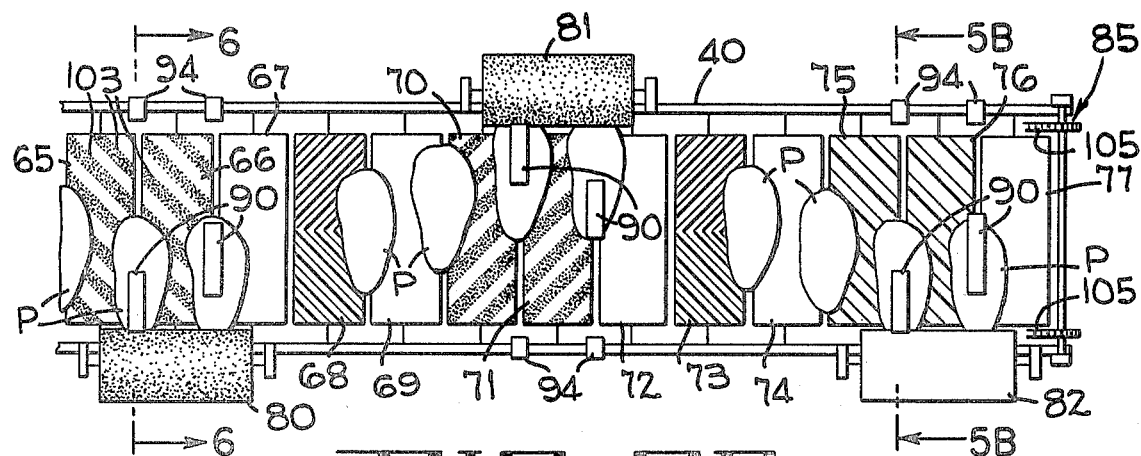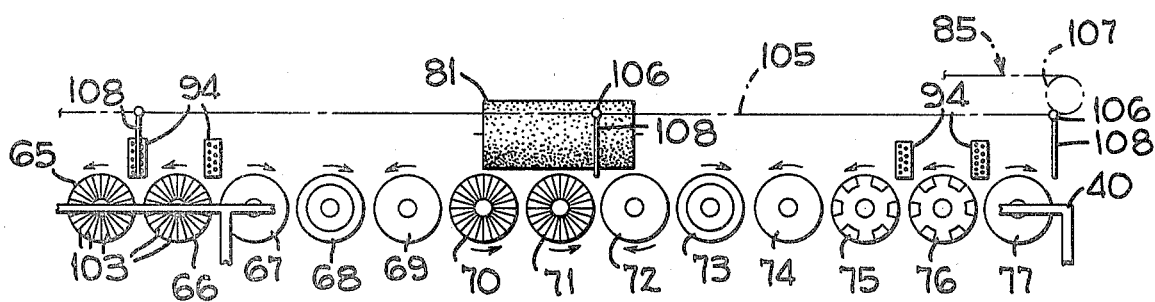

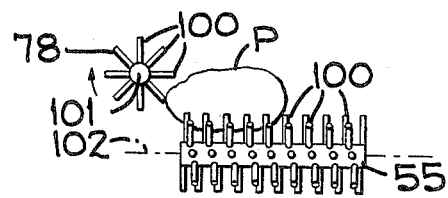
FIG_5A
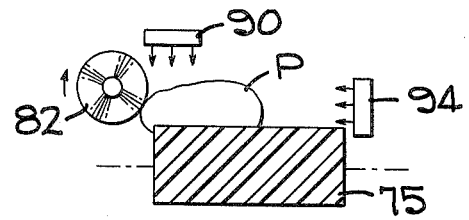
FIG_5B
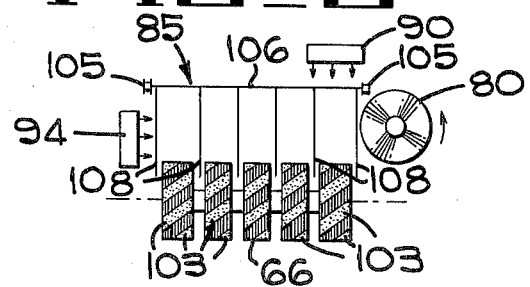
FIG_6
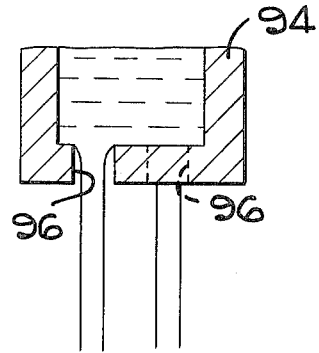
FIG_9

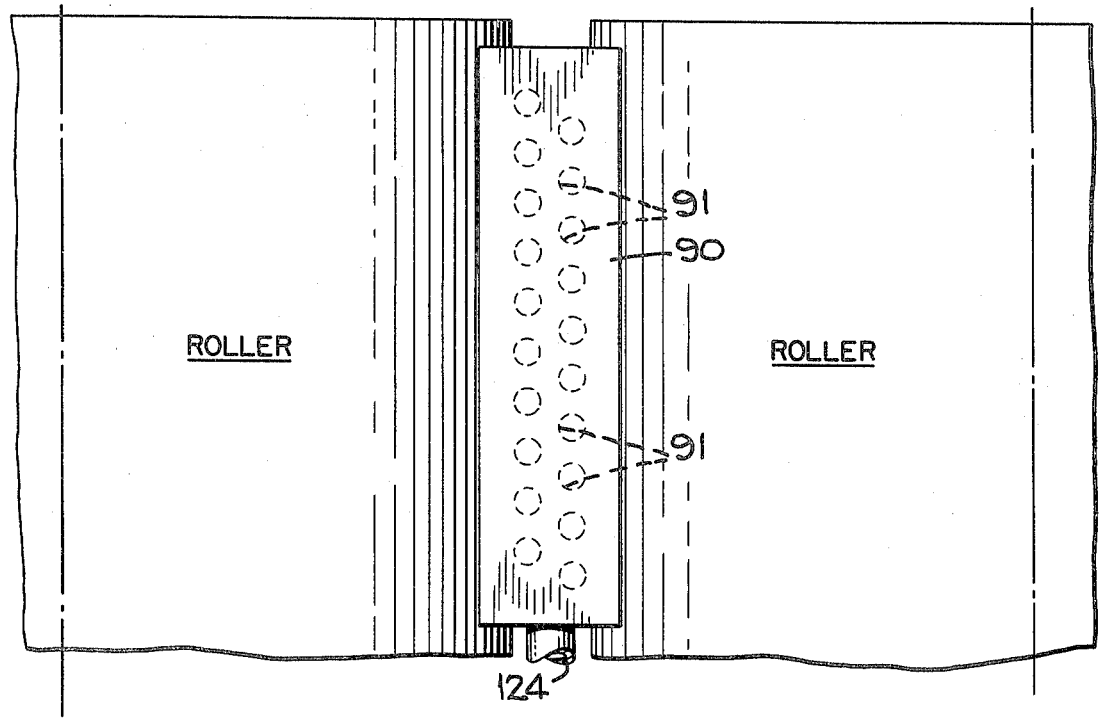
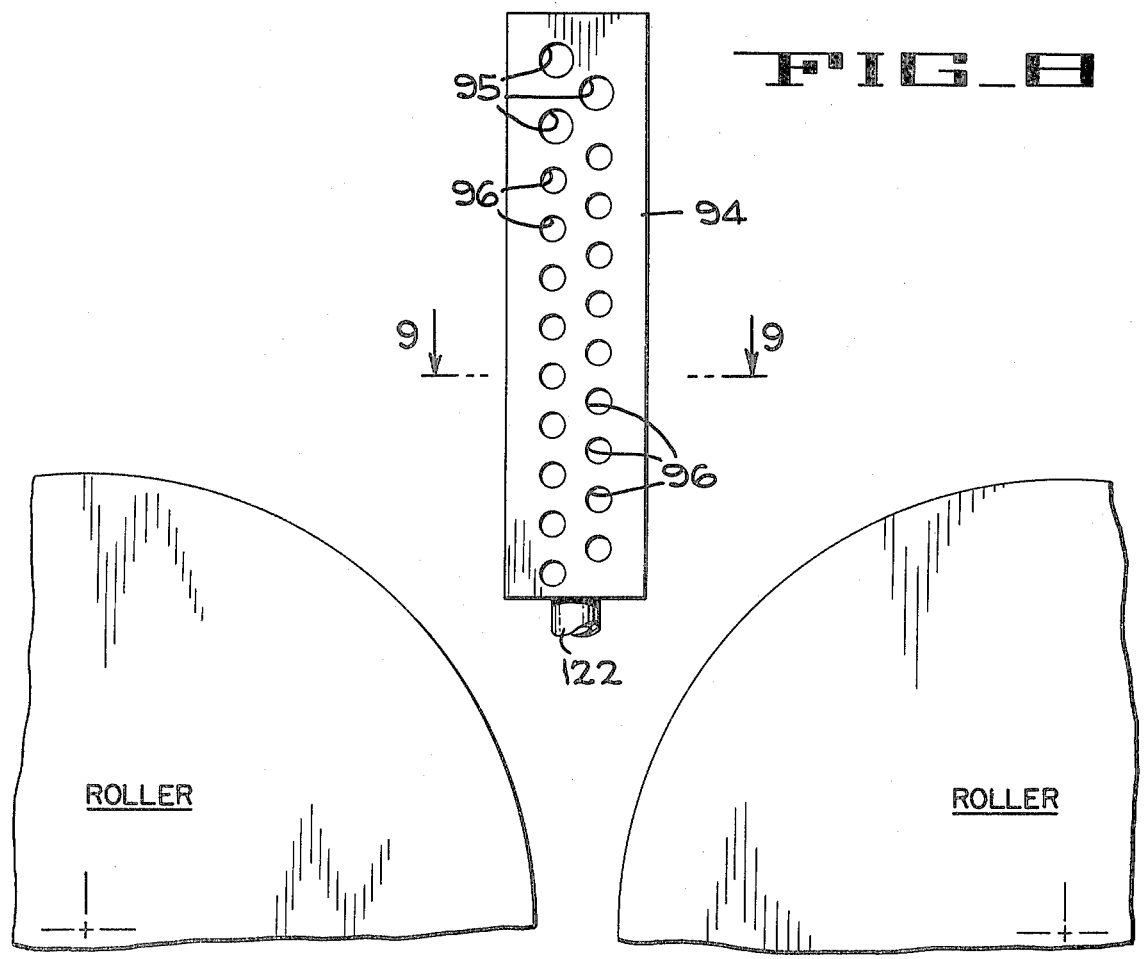

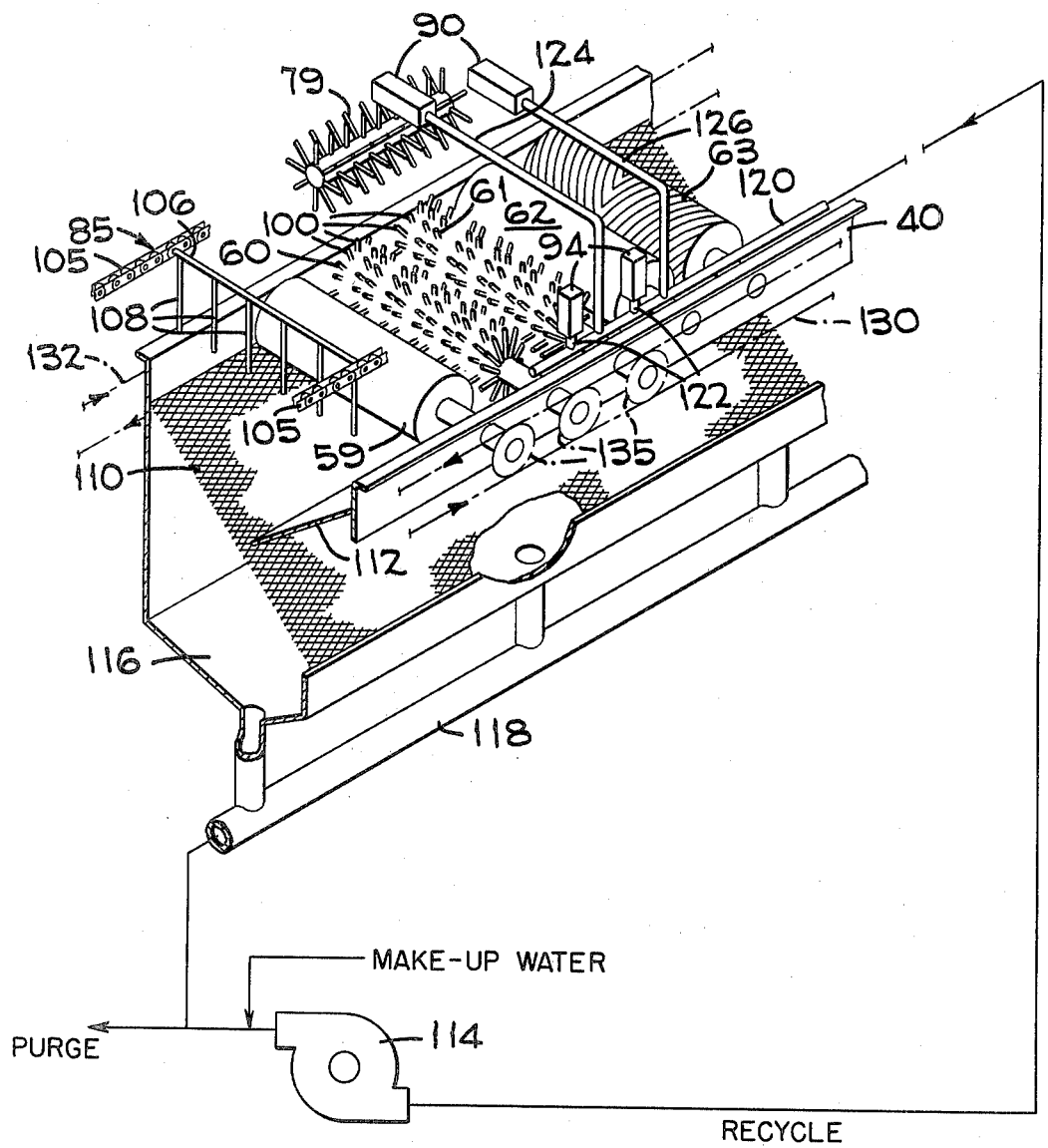

METHOD FOR REMOVING ROT FROM POTATOES

This application is a continuation of application Ser. No. 149,791, filed May 14, 1980, now abandoned.

BACKGROUND OF THE INVENTION

1. Field of the Invention

The present invention relates to a process and apparatus for cleaning vegetables prior to further processing. More particularly, it relates to removing the decayed portions of the exterior of a potato prior to steam or lye peeling of said potato.

2. Description of the Prior Art

Potato processing has become a major industry in the United States and a significant portion of the nation's potato crop now undergoes some form of preparation before being marketed. Frozen potatoes, potato chips and mashed potato flakes are typical of the products prepared from raw whole potatoes. For each of these products, it is necessary that the potato be peeled and blemished portions of the potato flesh be removed prior to processing.

The term blemish is used by the U.S. Department of Agriculture in grading the quality of processed potatoes and includes all defects which detract from the appearance of the final processed potato. A greater number of blemishes found in a given quantity of processed potatoes leads to a lower quality grade for the associated batch of potatoes. Several types of blemishes occur naturally during the growth of potatoes. These include "sunburn" which is a green discoloration resulting from exposure of the potato to sun during growth, "hollow heart" which is a hollow core resulting from overwatering, "scabbing" which is a thickening of the skin resulting from disease of freezing, and insect damage which often results in rot or decay. The terms rot and decay both denote a breakdown of the tissue of the potato and will be used interchangeably hereinafter.

The majority of blemishes found on harvested potatoes result not from natural growth patterns, but rather from bruises which are caused by mechanical impact during harvesting. Initially, such bruises are merely a discoloration located at the peel or skin. With time, however, enzymes released by broken cells cause increasingly greater portions of the potato flesh to rot and turn brown. If the potato peel is breached and bacteria enter, a bacterial rot is caused rather than enzymic rot. In either event, large portions of the potato are blemished as a result of decay.

Peeling during potato processing is presently accomplished by one of two methods. Most commonly, the potatoes are treated with a lye solution which raises the skin from the flesh. Alternatively, the potato may be subjected to a blast of pressurized or superheated steam which has the same effect. After either peeling process, the skin may be washed away using a water stream and abrasive rollers, but such scrubbing leaves the blemished areas of the potato intact. Such a skin removal device is disclosed in U.S. Pat. No. 2,776,690 to Warren.

The method of skin removal described by Warren has little effect on blemishes which extend beneath the potato skin. It is therefore necessary to manually cut away the blemished portions from the peeled potato, a tedious and expensive processing step. Another disadvantage of manual trimming is that the trimmers often removes good flesh from the potato since it is difficult to judge the depth of blemish beneath the surface.

The majority of blemishes which must be removed are rotten or decayed portions of the potato peel and the potato flesh extending inward from the peel. It is desirable, therefore, to provide a method and an apparatus to mechanically remove decayed portions from whole potatoes while removing little or no undecayed potato flesh.

SUMMARY OF THE INVENTION

The present invention is a method and an apparatus for hydraulically removing the decayed portions of a whole potato prior to the peeling thereof. The method comprises the steps of supporting the potato relative to a series of water spray nozzles adapted to direct water against all areas of the potato surface, and directing such streams at a predetermined intensity in order to loosen and remove the decayed portions of the potato skin and flesh. The method requires that the water force applied to the surface of the potato be within a range strong enough to remove the rot but not strong enough to disrupt the remaining skin and flesh of the potato.

The apparatus for carrying out the above method comprises a plurality of rollers forming a path for supporting the potatoes, a means for impelling said potatoes down said path, nozzle means for directing the water spray at the potatoes, said potatoes being positioned by the rollers to receive spray over their entire surface area, and a means for providing water to the nozzles within the appropriate pressure range.

The preferred embodiment of the invention includes rollers with an abrasive surface which disrupt the decayed areas of the potato peel in order to reduce the pressure and quantity of water used.

DESCRIPTION OF THE DRAWINGS

FIGS. 1A, 1B, 1C, 1D, 1E, and 1F show a section of a blemished potato at various stages of decay and various stages of treatment by prior art methods and by the present invention.

FIG. 2 is a graph illustrating the pressure thresholds at which various components of the potato are eroded.

FIGS. 3A and 3B together comprise a diagrammatic plan view of the apparatus of the present invention.

FIGS. 4A and 4B together comprise a diagrammatic elevation view of the apparatus of the present invention.

FIG. 5A is a section taken along line 5A—5A of FIG. 3A.

FIG. 5B is a section showing the penultimate washing station taken along line 5B—5B of FIG. 3B.

FIG. 6 is a section illustrating the rake mechanism taken along line 6—6 of FIG. 3B.

FIG. 7 is an enlarged plan view showing one of the horizontal spray nozzle assemblies.

FIG. 8 is an enlarged elevation view showing one of the vertical spray nozzle assemblies.

FIG. 9 is an enlarged partial section taken along line 9—9 of FIG. 8.

FIG. 10 is a diagrammatic perspective view of a segment of the roller support means and illustrating the water recycle system of the present invention.

DESCRIPTION OF THE PREFERRED EMBODIMENT

FIG. 1A illustrates one end of a russet potato P a short time after harvesting. The potato P has a variety of blemishes resulting both from natural growth patterns and from mechanical impacts which occurred during harvest. The natural blemishes include an eye located at 10 and a patch of thick skin (or scab) located at 12. Bruises resulting from handling during harvesting are shown at locations 14, 15 and 16. Initially, such bruises result in a slight discoloration of the flesh as indicated by the shaded areas in FIG. 1A. With prolonged storage, however, decay penetrates deeper into the potato flesh, as illustrated by the larger shaded areas of FIG. 1B. The potato peel becomes dried and brittle and turns dark.

Since potato processing plants operate for a period ranging from ten to twelve months every year while potato harvesting occurs only during a short interval in the Fall of each year, it is necessary to store a substantial portion of the potato crop for a period of many months before processing. During this period of storage, relatively minor bruises suffered during harvest mature into large areas of rot affecting a significant portion of the potato's volume.

FIG. 1B illustrates the potato of FIG. 1A as it might appear after many months of storage. The minor bruises at locations 14 and 16 have penetrated significantly into the potato flesh. The heavier bruise at location 15 has deeply penetrated the end of the potato. The peel at 15 has dried and contracted, leaving a brittle surface with small cracks therein. Broken line 17 indicates the initial size of the potato before shrinking caused by dehydration. The eye of the potato at 10 and the patch of thick skin at 12 remain essentially unaltered.

Before being processed into final product, the potato of FIG. 1B must be peeled and have its blemished areas removed. The next step in the prior art is to peel the potato using conventional lye or steam treatment. The potatoes are normally conveyed to the peeler in water which softens the rotted areas of the peel which have become brittle, as described hereinbefore. The results of such peeling are shown in FIG. 1C. The peeling step removes the natural blemishes at locations 10 and 12 as well as the minor bruises at 14 and 16. The decayed portions of the peel and flesh are more resistant to lye and steam peeling than are the intact portions. Thus, in order to remove the minor blemishes completely, a thick layer of potato flesh from all of the potato surface must be removed, as may be seen by reference to the dashed outline 18 which indicates the size of the potato prior to peeling. Even with such excessive peeling, the major decayed portion at location 15 remains. To attempt to remove the rot at 15 by steam or lye treatment would result in near total consumption of the good potato flesh.

After peeling, conventional processing calls for the manual trimming of the remainig blemished portion of the potato P. Since trimmers are unable to accurately estimate the depth of the rot, they will usually cut an additional portion of good potato flesh to insure that all the rot is removed. The results of such a cut are shown in FIG. 1E. Weight loss suffered by the potato as a result of such conventional processing, including trimming, often approaches thirty percent. The present invention reduces such weight loss, decreases the time that the potato is exposed to steam or lye treatment, and reduces the need for trimmers to manually pare out portions of the potato.

The present invention results from the discovery that decayed or rotted areas of the potato skin and flesh are more susceptible to removal by water jets having a cross-sectional area and a pressure lying within a particular range than unblemished portions of the same potato. By subjecting the entire surface area of a blemished potato to such streams, it is possible to dislodge and remove both the rotted peel and decayed flesh of the potato without additional mechanical aids. However, as will be explained hereinafter, the combination of such water streams with certain scrubbing means result in the most efficient removal of rot and is encompassed within the present invention.

As illustrated in FIG. 1D, subjecting the potato P to such streams of water removes virtually all the decayed portions of the potato while leaving the undecayed portions of the potato skin and potato flesh intact. The water jets are able to dislodge the decayed portions of the potato peel and flesh at locations 14, 15 and 16 until reaching the interface between the decayed potato flesh and the undecayed potato flesh shown along hatched lines 21, 22 and 23. The firm flesh below the interface resists the erosive action of the water jets. Additionally, the water jets are able to remove the patch of thick skin at 12, but the eye at 10 will remain until after the potato is peeled.

The present invention is capable of removing all blemishes on the potato which result in rot at the peel and in the flesh extending inward beneath the rotted peel. Such blemishes include bruises, scab, many forms of insect damage, and the like. Blemishes which do not weaken the cell structure, such as "sunburn", or which are internal to the potato, such as "hollow heart", are unaffected by treatment according to the present invention.

The removal of decay prior to peeling reduces the loss of good potato flesh during peeling. Although peeling must still be accomplished by conventional means, the peeling time is reduced since decayed portions which require additional treatment are no longer present. The result of such conventional peeling after decay has been removed by the present invention is shown in FIG. 1F. The loss of potato is indicated by the area between the dashed line 25, which represents the volume of the potato in FIG. 1D, and the solid line which represents the final volume of the potato after peeling. The amount of potato lost by peeling after decay removal (FIG. 1F) is much less than when peeling occurs prior to decay removal (FIG. 1C). In addition, the need to manually trim the potato, as in FIG. 1E, is reduced or eliminated.

FIG. 2 is a graph illustrating the erosive threshold for various portions of the russet potato as a function of both water pressure and nozzle diameter. The nozzle diameter relates directly to the cross-sectional area of the water stream, as will be discussed hereinafter. Tests were conducted by directing several water streams at the surface of the potato. The streams were nondivergent and emanated from a sharp-edged orifice. The upstream pressure and the orifice diameters were varied and the results noted. The orientation of the potato was changed during the test to insure that the entire surface area was subjected to the water for a period ranging from one to two seconds. The potatoes were then examined to determine which surface areas had been eroded, said surface areas being classified as undecayed peel, undecayed flesh, decayed areas which were dried after extended storage, and decayed areas which were soaked in water prior to treatment. Four lines are shown on the graph, each line representing the combination of pressure and nozzle diameter at which each class of surface area is first eroded.

Line 31 indicates that the undecayed peel of a potato is resistant to water pressure below approximately 150 psig regardless of the area of the water stream (nozzle diameter).

Line 32 indicates that the undecayed flesh of the potato is resistant to water pressure above 50 psig for all nozzle diameters greater than approximately 0.07 inches. The slope of line 32 further indicates that the resistance to erosion increases with increasing nozzle diameter.

Line 33, on the other hand, indicates that areas of decayed skin and flesh on the russet potato which have dried and become brittle during storage are increasingly susceptible to disruption by water pressure as the nozzle diameter increases. With a nozzle diameter of approximately 0.07 inches, a water pressure of approximately 50 psig is required to disrupt the skin. With the nozzle diameter of approximately 0.10 inches, this threshold level of disruption has decreased to approximately 40 psig. The reason for this phenomenon is that the decayed peel is removed by forcing water through the cracks and underneath the peel, thus lifting the peel. As the area of the water stream is increased, therefore, the probability that water will breach the peel through a crack increases and it becomes increasingly likely that peel will be removed.

Line 34 in FIG. 2 represents the threshold of erosion for decayed peel and flesh after soaking in a water bath for approximately 20 minutes. The water pressure required at each nozzle diameter up to approximately 0.23 inches is reduced from that required when the potato has not been soaked.

Normally, the potatoes to be treated will be conveyed in water prior to processing by the present invention. From FIG. 2, it will be apparent that presoaking allows operation at a lower water pressure and thus provides decreased pumping costs. However, it has been found that not all decayed portions of the potato soften after immersion in water. For that reason, it is preferred to operate the water spray of the present invention at a pressure above that of the threshold for dried blemishes indicated by line 33.

The shaded area 38 of the graph of FIG. 2 indicates the region of preferred operation. The lower boundry of this region is based upon the removal of dried decay (line 33) with a slight pressure margin to insure removal. The upper boundary is determined by the threshold at which undecayed flesh is eroded (line 32). Again, a pressure margin is provided to insure that no good flesh will be disturbed. The right-hand vertical margin is somewhat arbitrary and based on the maximum nozzle diameter consistent with reasonable water consumption.

The significance of the graph of FIG. 2 is that a finite range of combinations of water pressure and nozzle diameter exist which will erode the decayed portions of a russet potato while leaving the undecayed portions of the same potato intact. The choice of precise water pressure and nozzle diameters for a given operation will depend on an optimization of two cost factors. Operation with a small nozzle diameter reduces water consumption, but requires a high water pressure and increased power consumption. Operation with a large nozzle diameter decreases the power consumption, but also increases water consumption.

The primary object of the apparatus of the present invention is to pass the potatoes being processed through a series of water nozzles with diameters in the range of from about 0.05 to 0.2 inches operated at a pressure in the range from about 25 to 65 psig. A secondary object of the apparatus is to provide a means for mechanically disrupting the decayed portions of the potato prior to treatment with the water spray. Mechanically disrupting the decayed crust on the peel insures that sufficient cracks are present so that the crust may be removed with minimum water pressure. The precise design of one embodiment of the present invention will now be described.

Referring to FIGS. 3A, 3B, 4A and 4B, the apparatus of the present invention comprises a frame 40 supporting a plurality of rollers 51–77 underlying the potatoes and a plurality of rollers 78–82 for contact with the ends of the potatoes, a rake assembly 85 adapted to advance potatoes along the rollers 51–77, horizontal spray nozzle assemblies 90 adapted to direct a spray onto the girth of the potatoes, and vertical spray nozzle assemblies 94 adapted to spray the ends of the potatoes. Additionally, a pumping system (FIG. 10) for supplying water to the nozzles, including means for recycling used water to the nozzles, is provided.

FIGS. 3A and 3B show the layout of the rollers 51–82, the associated horizontal spray nozzle assemblies 90, and the vertical spray nozzle assemblies 94. The purpose of the rollers is two-fold. First, the rollers position individual potatoes in relation to both the horizontal spray nozzle assemblies 90 and the vertical spray nozzle assemblies 94 so that the entire surface area of each potato is subjected to the water spray. Second, certain of the rollers are intended to mechanically disrupt the crusted portions of the potato peel to aid in the erosion of the decayed flesh beneath. Such mechanical disruption of the peel allows the system to operate very close to the dried decay threshold at line 33 of FIG. 2, thus minimizing the power requirements of the apparatus. With this in mind, the nature and function of each of the rollers 51–82 will now be explained.

Potatoes, which may or may not have been previously soaked in water by hydraulic conveying equipment, enter the apparatus through a chute 98 (FIGS. 3A and 4A) at one end of the frame 40. The potatoes land generally in the valley between rollers 51 and 52 and are aligned axially by the rotation of said rollers. The surface of the first two rollers is relatively soft with a high coefficient of friction so that potatoes will begin rotating when they land in the valley between rollers 51 and 52. As seen in FIG. 4A, both rollers 51 and 52 are driven in a clockwise direction so that a potato lying in the valley between will be rotated in a counterclockwise direction.

Such rotation helps to axially align the potatoes in the valley between rollers 51 and 52.

All rollers 51–82 of the present system have diameters approximately equal to that of the largest potato to be processed. The speed of rotation of the rollers is chosen so that a large potato will make at least one revolution at each "station" between adjacent rollers 51–77 driven in the same direction, where said station is the valley between the rollers. The speed of rotation depends, therefore, on the speed at which potatoes are advanced along the rollers by the rake assembly 85. A typical value would be approximately 60 rpm with the rake assembly 85 advancing potatoes between stations at a rate of one station each second.

As a potato advances from station 51–52, the axis of the potato is aligned generally with the axes of the rollers. Roller 53 has a raised surface of high friction chevrons and is also rotated clockwise as viewed in FIG. 4A. At station 52–53, the potato continues to rotate in a counterclockwise direction, and an additional opportunity is provided for the potato to become aligned with the rollers.

Roller 54 is a transfer roller having a low friction surface. By rotating in a counterclockwise direction (FIG. 4A) it damps the spin on the potato at station 53–54 and serves as a transition to the next station 54–55, where the potato is spun in the opposite, clockwise, direction. Additionally, the chevrons on roller 53 act to center the potato at station 53–54. The centering of the potato at said station, in turn, acts to singulate the potatoes so that only one potato at a time will be positioned at station 53–54. By positioning the potato at the center of the station, there is no room for a second potato. Other potatoes will remain in back of station 53–54 until the potato at said station has been advanced by the rake assembly 85, as discussed hereinafter.

Rollers 55 and 56 each have a surface comprised of a plurality of rubber fingers or appendages 100 (FIGS. 3A, 4A and 5A) arranged spirally around the roller. The rubber appendages serve two purposes. First, the appendages disrupt the decayed areas on the potato peel prior to application of the water spray. The size and flexibility of the appendages is chosen so that the appendages will penetrate the decayed areas on the potato surface which are soft while yielding to the hard areas which are not decayed. Additionally, the spiral arrangement of the appendages 100 acts as a screw conveyor and causes the potato to move toward roller 78 located adjacent one end of stations 55–56 and 56–57.

Roller 78 (FIGS. 3A and 5A) has a surface comprised of the same appendages 100 as the appendages 100 that are found on rollers 55 and 56. The pattern of the appendages on roller 78, however, need not be spiral. The purpose of roller 78 is to disrupt any decayed peel located at one end of the potato surface. Referring to FIG. 5A, the axis 101 of roller 78 lies in the longitudinal direction of the apparatus and is disposed above the axis 102 of the transverse roller 55. FIG. 5A further shows that roller 78 rotates in a clockwise direction (as viewed therein) which keeps the end of the potato down. Roller 78 is positioned so that the upper half of one end of the potato is contacted by the appendages at a given instant in time. Since the potato is rotated fully about its longitudinal axis by rollers 55 and 56, the entire end of the potato is contacted by roller 78 during the time the potato is at station 55–56. The same potato end continues to contact roller 78 at the next station 56–57.

Roller 57 is a transfer roller similar to roller 54 and serves as a transition to roller 58 which is a centering roller similar to roller 53. A transition roller is required between rollers 56 and 58 for two reasons. First, the spiral arrangement of the appendages on roller 56 drives the potato in the opposite direction from the chevrons on roller 58. If rollers 56 and 58 were adjacent, the forces on the potato between would tend to drive the potato out of transverse alignment. Second, rollers 56 and 58 are driven in opposite directions and roller 57 aids in reversing the direction of spin on the potato as it advances.

Roller 59 is also a transition roller similar to rollers 54 and 57. Rollers 60 and 61 are similar to rollers 55 and 56 except that the spiral formation of the appendages 100 on said rollers drives the potatoes in the opposite transverse direction. The longitudinally aligned roller 79 is associated with rollers 60 and 61 and adapted to disrupt the end of the potato opposite to that disrupted at stations 55–56 and 56–57.

The first horizontal spray nozzle assembly 90 and vertical spray nozzle assembly 94 are found at station 60–61. The construction of a horizontal spray nozzle assembly is illustrated in FIG. 7. The assembly 90 consists of a housing having a plurality of individual nozzle openings 91 on the lower face thereof each having a diameter of approximately 0.10 inches. The nozzles 91 are arranged in such a way that adjacent nozzles overlap in the transverse direction of the assembly 90 (i.e., in the direction of movement of the potatoes therepast) so that there are no gaps in the water sprays directed at the potato. The width of the assembly housing is approximately one-half inch and the length of the assembly housing is equal to approximately the diameter of the largest potato to be processed. As seen in FIGS. 3A and 10, one such assembly 90 is located above station 60–61 at the side thereof adjacent roller 79 where the potato is positioned by the rollers. The water sprays directed onto the potatoes from assembly 90 applies a downward force thereby urging the potatoes against the resilient fingers 100.

At the opposite side of station 60–61, a vertical spray nozzle assembly 94 is disposed to direct sprays at the end of the potato which had been treated previously by roller 78. The construction of such vertical spray nozzle assembly 94 is shown in FIG. 8. The diameter of nozzle openings 95 located at the top of the assembly housing is approximately 0.14 inches. The length of the assembly housing is equal to approximately 0.70 the diameter of the largest potato to be processed. The diameter of the remaining (lower) nozzle openings 96 is approximately 0.10 inches. By having the larger water streams strike the uppermost portion of the potato, the end of the potato is held down against the underlying rollers 60–62. The vertical spray nozzle assembly 94 is elevated above the transverse rollers 60–62 (FIG. 8) so that the spray from said vertical spray nozzle assembly will strike generally the upper half of the potato end. Since the potato completes at least one revolution at each station, the entire end of the potato will be treated. As with the horizontal assemblies 90, the nozzle openings 95, 96 overlap slightly in the direction of movement of the potatoes so that there will be no gaps in the water sprays which stikes a potato.

The next station 61–62 also has vertical and horizontal spray nozzle assemblies 94, 90 associated with it. The layout is the same as for the previous station except that the horizontal spray nozzle assembly 90 is located to direct spray toward the half of the potato not sprayed at station 60–61.

Rollers 62, 63 and 64 are transition, centering and transition rollers respectively. These rollers act in combination to transfer each potato from one side of the apparatus to the other. Rollers 65 and 66 (FIGS. 3B and 4B) are similar to rollers 55 and 56 except that bristles 103 (FIG. 4B) have been substituted for the rubber appendages 100. The bristles are an alternative to the appendages and may be substituted therefor. It is important that the bristles not be so stiff that they damage the good potato flesh. The spiral pattern of the bristles on these rollers 65 and 66 drives the potato into another bristled roller 80, similar to rollers 78 and 79, as described hereinbefore, with bristles having been substituted for the rubber appendages 100. Vertical spray nozzle assemblies 94 and horizontal spray nozzle assemblies 90 are again provided to remove decay from the potato at stations 65–66 and 66–67.

Rollers 67, 68 and 69 serve to shift the potatoes to the opposite side of the apparatus in the manner described hereinbefore in connection with rollers 57, 58 and 59.

Rollers 70, 71 and 81, together with the associated horizontal spray nozzle assemblies 90 and vertical spray nozzle assemblies 94 form an additional cleaning station identical to that formed by rollers 65, 66 and 80, except that the opposite end of the potato is subjected to the water spray from the vertical assemblies 94.

Rollers 72, 73 and 74 together form a final transfer group to shift the potato position to the opposite side of the apparatus, as described hereinbefore with reference to rollers 62, 63 and 64.

Rollers 75, 76 and 82, together with the associated horizontal spray nozzle assemblies 90 and vertical spray nozzle assemblies 94, form the final cleaning stations prior to exit of the potatoes from the apparatus. Rollers 75 and 76 are identical to one another in construction, each having a spiral ridge formed of rubber along the outer surface. The spiral ridge tends to drive the potatoes against the associated longitudinal roller 82. Having a ridge rather than rubber appendages 100 or brush bristles 103 allows the final cleaning station to shear off any debris which might be attached to the potatoes. The longitudinal roller 82 has a smooth surface since there are no vertical spray nozzle assemblies downstream to remove decay, if any, which would be dislodged by an abrasive surface.

The final transverse roller 77 is a transition roller similar to rollers 54, 57, 59 and the like. Roller 77 aids in the smooth discharge of potatoes from the apparatus. The potatoes exit onto a separate conveyor system (not shown) which transports them to the peel removal section of the processing facility.

The rake assembly 85, illustrated in FIGS. 3A, 3B and 6, is necessary to advance potatoes along the rollers 51–77. The rake assembly comprises a plurality of individual combs 106 supported on a pair of endless chains 105. The endless chains 105 are supported above the train of rollers by pairs of sprockets 107. Each of the rollers 51–77 are sectionized, as shown in FIG. 6, in order to allow the tines 108 projecting from the combs to penetrate the periphery of the rollers. A minimum number of tines 108 must be provided so that the space between adjacent tines 108 is less than the minimum expected diameter of the potatoes being processed. The spacing between combs 106 along the endless chains should be equal to a distance of six times the diameter of the rollers. The combs 106 first penetrate the rollers at station 53–54 and continue along the remainder of the rollers and past the final roller 77.

The speed at which the endless chains 105 are driven determines the speed at which potatoes advance down the train of rollers 51–77. The speed will depend on the amount of decay found in the potatoes being processed and will be the maximum possible consistent with a high degree of decay removal.

While the system speed may vary depending on the condition of the potatoes being treated, the speed at which the rollers are rotated depends directly on the speed at which the rake assembly 85 is being driven. It is essential that each potato remain at each station for the interval of time necessary for the potato to complete one full revolution. On the other hand, it is important that the rollers be driven at the minimum speed consistent with the aforementioned objective. Since all rollers are sized to have a diameter equal to the diameter of the largest potato processed, it is necessary to drive the rollers so that the tangential surface velocity of the roller is equal to the linear velocity of the combs of the rake assembly 85. Such a relation will insure the proper operation of the apparatus of the present invention.

FIG. 9 illustrates a single nozzle opening 96 in the vertical spray nozzle assembly 94. The nozzle 96 is a sharp-edged orifice which results in a substantially non-divergent flow pattern with a steam diameter slightly smaller than the diameter of the orifice. The nozzle opening illustrated is typical of all nozzle openings of the preferred embodiment except that nozzle openings 95 have a larger diameter. The nozzle openings used in the tests which resulted in the graph of FIG. 2 were also sharp-edged orifices.

FIG. 10 illustrates the water recycling system of the present invention. The frame 40 supports a screen 110 which projects downward from the frame at approximately a 45° angle. The screen 110 extends beneath the rollers 51–77 and is adapted to collect water and debris as it falls downward between said rollers. A baffle 112 extending beneath the rollers 51–77 from the opposite side of the frame 40 is provided to help direct water and debris to the screen.

The screen 110, with openings of approximately 0.02 inches, is adapted to remove the larger particulates from the water so that the water may be recycled by a pump 114. The separated particulates are washed over the screen and collected by conventional means not shown. The water passing through the screen is collected in a trough 116 where it passes to a recycle manifold 118.

A sufficient amount of water is purged from the recycle manifold 118 to maintain a predetermined concentration of particulates consistent with proper spraying through the nozzles. Make-up water is added to replace the water bled from the system. The water is then fed by pump 114 to the nozzle manifold 120 where it is directed to the individual nozzle assemblies 90, 94. Vertical spray nozzle assemblies 94 are mounted on short risers 122 extending upward from the nozzle manifold 120 and connected thereto. The horizontal spray nozzle assemblies 90 are mounted at the end of L-shaped pipe sections 124, 126 adapted to support the nozzle assemblies at the appropriate locations and carry water to said assemblies. Note that the vertical assemblies 94 and horizontal assemblies 90 at each station are longitudinally offset so that the sprays therefrom will not interfere with each other.

Endless chains 130 and 132 are provided on either side of the frame 40 in order to rotate the rollers in the appropriate direction. Chai 130 is driven in a counter-clockwise direction (as viewed in FIG. 10) and is adapted to drive all rollers which are required to be rotated in that direction. For example, rollers 59, 60 and 61, all of which rotate in the counterclockwise direction, are all provided with sprockets 135 which engage chain 130. On the opposite side of the frame, rollers 61 and 62 are provided with sprockets (not shown) to engage chain 132, which chain is driven in the opposite direction to chain 130. Means for driving the chains 130 and 132 are wholly conventional and are not illustrated.

Although the best mode contemplated for carrying out the present invention has been herein shown and described, it will be apparent that modification and variation may be made without departing from what is regarded to be the subject matter of the invention.

What is claimed is:

1. A method for removing decayed portions from the exterior of an untreated unpeeled potato with apparatus which includes potato supporting means and a plurality of rubber fingers, consisting essentially of the steps of:

supporting said potato relative to a plurality of water nozzles;

contacting substantially all surfaces of the potato with rubber fingers with sufficient force to crack the skin encompassing the decayed portions and to penetrate the decayed areas of the potato surface without damaging the peel or flesh of sound portions of the potato; and directing a plurality of water streams through the nozzles so that the water strikes substantially the entire surface of said potato for urging the potato against said rubber fingers with sufficient force to cause the fingers to penetrate the decayed portions and for disrupting and removing decayed portions from the potato without damaging the peel or flesh of sound portions of the potato, said decayed portions including decayed portions of the skin and decayed interior portions of the potato extending inwardly from the skin, while leaving the remaining portion of the potato surface intact.

2. A method as in claim 1, and additionally comprising the step of contacting the surface of the potato and penetrating the decayed portions prior to directing said water streams thereat for reducing the amount of water required to remove said decayed portions from the potato.

3. A method according to claim 1 or 2 and additionally comprising the step of rotating the potato while being contacted by said rubber fingers and said water streams for assuring that one or more fingers and one or more water streams engage substantially the entire exterior surface of the potato.

4. A method according to claim 2 wherein the diameter of said water streams is preferably within the range of about 0.05 to 0.20 inches and wherein said water pressure preferably lies within the range of about 25 to 65 psig.

5. A method according to claim 1 or 2 wherein the potato is rotated at least one revolution when being subjected to said fingers and water streams.

6. A method for removing the decayed peel and decayed flesh portions from the skin and underlying sound portions of a potato with apparatus including potato supporting means and a plurality of rubber fingers consisting essentially of: the steps of supporting the potato, contacting substantially all portions of the surface of the potato with the fingers with sufficient force to crack the skin encompassing the decayed portions and to penetrate the decayed portions of the potato surface without damaging the peel or flesh of sound portions of the potato, and directing streams of liquid against substantially all portions of the surface of the potato at a sufficient pressure for washing the potato and for forcing liquid through cracks and underneath the decayed peel for lifting the decayed peel and removing the decayed flesh while removing a minimum of sound peel and sound flesh of the potato.

7. A method according to claim 6 and additionally comprising the step of establishing relative rotation between the potato and said rubber fingers while the potato is being contacted by said fingers.

8. A method for removing decayed portions from the sound portions of a potato with apparatus including potato supporting means and a plurality of rubber fingers; consisting essentially of the steps of supporting the potato, contacting substantially all portions of the surface of the potato with the rubber fingers with sufficient force for causing the rubber fingers to penetrate the decayed portions without damaging the flesh of sound portions of the potato, urging the potato against said rubber fingers with sufficient force to cause the fingers to penetrate the decayed portions, and directing streams of liquid having a diameter of between about 0.05 to 0.2 inches against substantially all portions of the surface of the potato at a pressure within the range of about 25 to 65 psig for washing the potato and removing the remaining decayed flesh while removing a minimum of sound flesh from the potato.

9. A method for removing decayed portions from the exterior of a potato with the aid of a plurality of rubber appendages, consisting essentially of the steps of:

supporting said potato relative to a plurality of water nozzles;

engaging the exterior of the potato with the rubber appendages with sufficient force to disrupt the decayed areas of the potato, the size and flexibility of the appendages being chosen so that the appendages will penetrate the decayed areas of the potato surface which are soft while yielding to the hard areas which are not decayed; and directing a plurality of water streams through said nozzles so that water strikes substantially the entire surface of said potato, said water streams having sufficient force to disrupt and remove said pentrated decayed portions from the potato, said decayed portions including interior portions of the potato extending inwardly from the surface, while leaving the remaining portions of the potato surface intact.

10. A method according to claim 6 wherein the rubber fingers are mounted on a plurality of driven rollers including two pairs of potato supporting rollers and end rollers positioned adjacent opposite ends of associated pairs of said potato supporting rollers; and additionally comprising the steps of spirally orienting the fingers on one pair of potato supporting rollers for driving the potato in one direction for engaging one end of the potato against the fingers of one of said end rollers, and orienting the fingers on another pair of potato supporting rollers for driving the potato in the opposite direction for engaging the other end of the potato against the fingers of the other of said end rollers, said step of directing streams of liquid against the potato including directing streams of water against one end portion of the potato when the opposite end portion of the potato is contacted by said rubber fingers of one end roller.

11. A method according to claim 8 wherein the rubber fingers are mounted on a plurality of driven rollers including two pairs of potato supporting rollers and end rollers positioned adjacent opposite ends of associated pairs of said potato supporting rollers; and additionally comprising the steps of spirally orienting the fingers on one pair of potato supporting rollers for driving the potato in one direction for engaging one end of the potato against the fingers of one of said end rollers, and orienting the fingers on another pair of potato supporting rollers for driving the potato in the opposite direction for engaging the other end of the potato against the fingers of the other of said end rollers, said step of directing streams of liquid against the potato including directing streams of liquid against one end portion of the potato when the opposite end portion of the potato is contacted by said rubber fingers of one end roller.

12. A method according to claim 9 wherein the rubber fingers are mounted on a plurality of driven rollers including two pairs of potato supporting rollers and end rollers positioned adjacent opposite ends of associated pairs of said potato supporting rollers; and additionally comprising the steps of spirally orienting the fingers on one pair of potato supporting rollers for driving the potato in one direction for engaging one end of the potato against the fingers of one of said end rollers, and orienting the fingers on another pair of potato supporting rollers for driving the potato in the opposite direction for engaging the other end of the potato against the fingers of the other of said end rollers, said step of directing streams of water against the potato including directing streams of water against one end portion of the potato when the opposite end portion of the potato is contacted by said rubber fingers of one end roller.

* * * * *